TRANSISTOR RELAY AND SIGNAL SHAPING DEVICE

Filed May 27, 1955

INVENTOR
PHILLIP G. WRAY
BY Emery Robinson
ATTORNEY 2,905,835

TRANSISTOR RELAY AND SIGNAL SHAPING DEVICE

Phillip G. Wray, Niles, Ill., assignor to Teletype Corporation, Chicago, Ill., a corporation of Delaware Application May 27, 1955, Serial No. 511,478

7 Claims. (Cl. 307—88.5)

This invention relates to transistor relay devices and more particularly to a transistor oscillator adapted to be selectively turned on and off in response to the application of signals of predetermined energy levels.

In the transmission of telegraph signals where each signal impulse may be either of two potential or energy levels, the signal impulses imparted through the transmitting medium are often distorted. When the signals are originally generated the lines of demarcation between the signal impulses of different potential levels are sharply defined, but during transmission, interference, noise, atmospheric conditions and other factors cause these lines of demarcation or transition to fade. As a result, signals are received wherein the transitions between signal impulses of different potential levels are of gradually increasing or decreasing levels. The signal received does not have the square wave shape that was imparted to the signal at the transmitter. If such signals are utilized to operate various receiving devices in a telegraph apparatus, it may be appreciated that said devices will not instantly respond to changing potential levels but rather will operate slowly, thereby causing the telegraph apparatus to function improperly. Where the receiving apparatus consists of electronic or transistor controlled components the loss of sharp transition between signal impulses precludes the instant response of these devices to changing potentials.

In the design of any device for repeating signals it is desirable to be able to transmit signals having one reference potential to circuits having a different reference potential. Previously, electromagnetic relays, electronic tubes and magnetic diodes have been employed to obtain electric isolation between circuits. However, these devices have presented several undesirable limitations such as excessive power consumption, time delay, short life, pitting contacts, large space requirements, feed back, etc.

It is a primary object of this invention to provide a compact receiving relay device utilizing a minimum amount of power and requiring no moving parts.

A further object of the invention resides in a signal shaping device wherein signals having no sharp transition lines between signal impulses of different potential levels are reshaped into signals consisting of impulses having sharp lines of transition between said impulses.

A more specific object of the invention is to provide a transistor oscillator adapted to be operated by incoming signal impulses, but which is precluded from such operation until the individual signal impulses have attained a predetermined amplitude.

An additional object of the invention is the provision of circuits for controlling the transistor oscillator to produce output signal impulses having one or another of two precise potential levels and a sharp transition line between signal impulses which are of different potential levels.

In the present invention both the so-called N–P–N and P–N–P type junction transistors are utilized. These transistors are disclosed in the patent to W. Shockley, No. 2,569,347, and as therein described consist of a body of semiconductive material having therein a zone of one conductivity type, N or P, between and continuous with two zones of the opposite conductivity type. Emitter and collector electrode connections are made respectively to the outer zones, and a third connection, by a base electrode, is made to the intermediate zone. If a transistor of the N–P–N type has a large positive bias on its collector and a small positive bias on its emitter then a relatively large positive current will flow out of the semiconductor body. If the transistor is of the P–N–P type and the polarities of the applied potentials are reversed, then currents in opposite directions to those previously mentioned will flow. The present invention is described with respect to a device employing both types of transistors but it is to be understood that the selection of a particular type of transistor is merely a matter of choice and that other types of transistors, such as the so-called point contact transistors described in the patent to Bardeen et al., No. 2,504,035, dated October 3, 1950, may be utilized by merely making simple changes in biasing and operating potentials.

In this invention an oscillator is utilized which comprises essentially an N–P–N type junction transistor having a parallel resonant circuit connected in its base circuit and a collector to base feedback circuit.

With these introductory remarks and objects in view the present invention contemplates a transistor oscillator held from operation by a normally nonconducting control transistor. In turn, the transistor is held from operation by a voltage regulator device. The voltage regulator is a silicon Zener diode which is adapted to permit the flow of current therethrough in a reverse direction after a predetermined back bias has been applied thereto.

In operation of this device when a marking or current impulse is first applied over a signaling channel the increase in potential is simultaneously applied to the transistor oscillator and the diode. The diode will not immediately conduct if the signal impulse is of an insufficient magnitude, however, if the transition in applied potential due to the incoming marking signal increases to a sufficient magnitude a potential is attained that causes the diode to operate in its reverse direction. Commencement of conduction through the diode is followed by operation of the control transistor which instantly permits the transistor oscillator to commence operation. The output from the oscillator is amplified and demodulated to produce D.C. signals having square corner envelopes, thereby providing sharp transition between the marking and spacing signal impulses. Electrical isolation is provided between the oscillator and the amplifying and demodulating components.

Other objects and advantages of the present invention will be apparent from the following detailed description when considered in conjunction with the accompanying drawing wherein.

Figure 3:
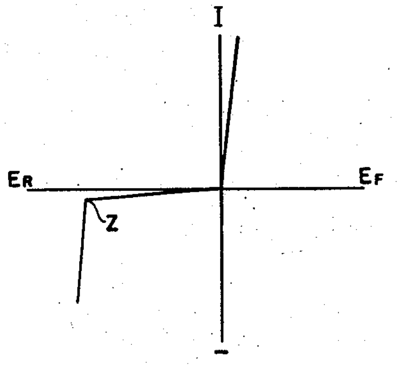

(1) A distorted signal,
(2) the output of the oscillator, and
(3) and (4) the output signals; and Fig. 3 is a diagram showing the operating characteristics of a silicon Zener diode.

Figure 1:
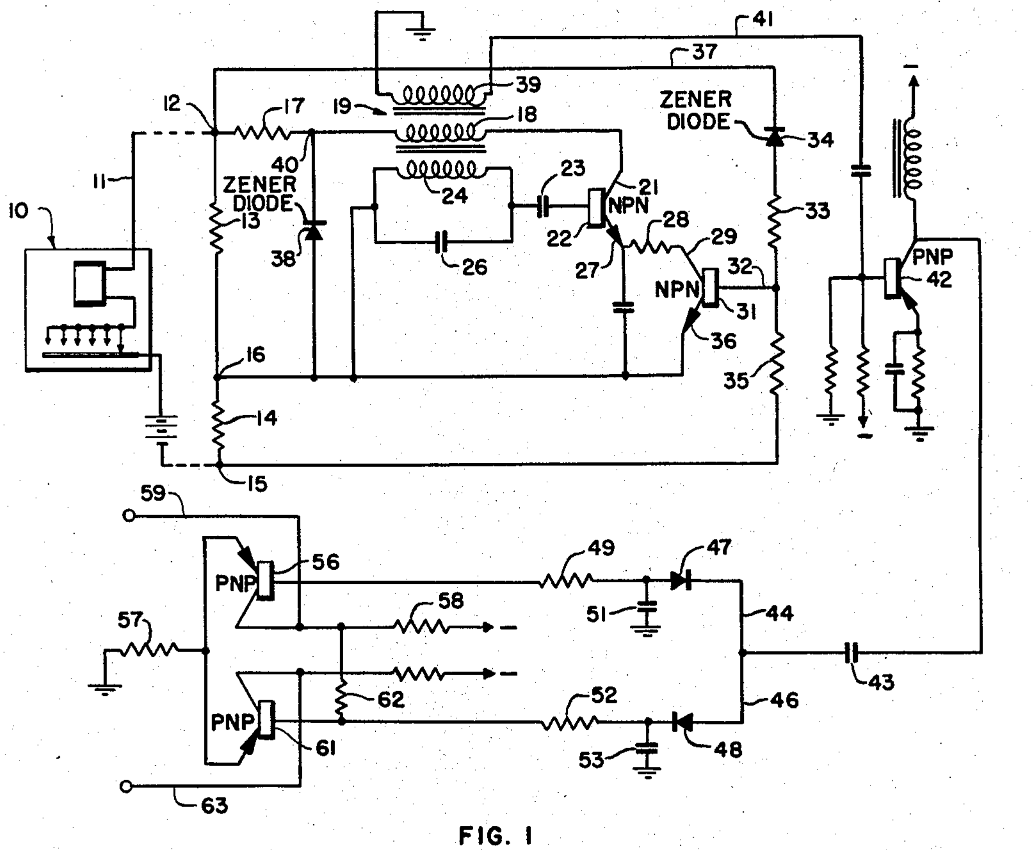
Fig. 1 is a circuit diagram of a transistor line relay embodying the principal features of the invention.

Referring now to Fig. 1 there is shown a start-stop signal generator generally designated by the reference number 10. The signal generator is adapted to impart on a signaling line 11, start-stop signals which consist of a permutation of marking (current) and spacing (no current) impulses. As these signals are generated the line of demarcation between a marking and a spacing signal is characterized by a sharp transition from a positive potential level to a potential level of zero. During the course of transmission of signals over the line 11 this sharp line of transition fades and instead of having the sharp line of transition from a spacing to marking condition, the received signals are characterized by a gradual slope (see wave form I in Fig. 2). In order to secure proper functioning of receiving apparatus, it is necessary that the sharp line of transition be restored between signal impulses of different potential level.

Signal line 11 terminates at a junction point 12 in a receiving apparatus. Junction point 12 is connected through resistances 13 and 14 to the transmission line running to the negative side of the source of battery at the transmitting station 10. A junction point 16 will be considered as the zero potential reference point of the isolated circuit; hence, the increase in current caused by a transition from a spacing condition to a marking condition causes potential at junction point 12 to increase with respect to the potential of point 16, and causes potential at a junction point 15 to decrease (become negative) with respect to the potential of point 16. This rise in potential on junction point 12 is impressed through a resistance 17, through a central winding 18, of a triple wound transformer 19 to a collector 21 of an N-P-N type junction transistor 22. Transistor 22 has its base connected through a coupling condenser 23 to a parallel resonant circuit comprising a lower inductive winding 24 of the transformer 19 and a capacitance 26. The resonant circuit is connected to the junction point 16, which as previously mentioned, is at zero reference potential.

Returning now to a consideration of transistor 22, it may be noted that an emitter 27 of the transistor is connected through a resistance 28 to a collector 29 of a second transistor 31. Transistor 31 has a base 32 connected through a resistance 33 to the low resistance side of a silicon Zener diode 34 Base 32 is also connected through a resistance 35 to the negative side of the incoming line. When no current flows through the diode 34, the base 32 is held negative with respect to an emitter 36. The emitter 36 is connected to junction point 16 which is at zero potential. Junction point 12 is connected by means of a lead 37 to the high resistance side of the diode 34. It will be appreciated that the negative potential developed across resistance 14 is applied to the base of the transistor 31 and hence holds this transistor in a nonconductive state. Inasmuch as transistor 31 is precluded from operation, then the transistor 22 is likewise precluded from operation due to the inability of current to flow from the body of the transistor through the emitter 27 to the collector 29 of the transistor 31 and from there to the junction point 16 which is at zero potential.

Referring to Fig. 3, the operating characteristics of the silicon Zener diode are illustrated. The theory of operation and construction of these silicon Zener type diodes are described in an article by Pearson and Sawyer on pages 1348 and 1351 in the proceedings of IRE, November 1952 issue, vol. 40, No. 11. It will be noted that when small values of positive voltage $E_T$ are applied in a reverse direction such as occurs when positive battery is initially applied over lead 37, the diode will not pass current. As illustrated in Fig. 3, increases in reverse voltage results in very little increase in current flow until Zener point Z is reached whereupon the diode in effect breaks down and the current increases very rapidly becoming substantially independent of voltage.

Figure 2:
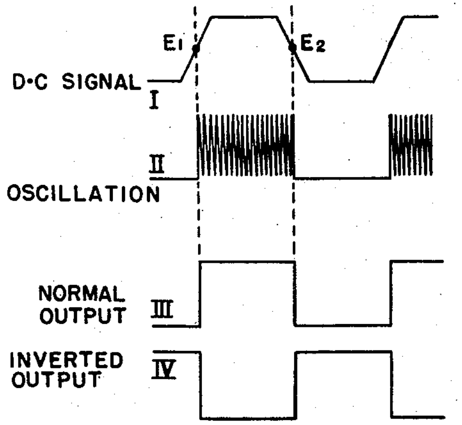
Fig. 2 is a wave form diagram illustrating.

Looking at Fig. 2, wave form I, when the transition in applied voltage rises to a point $E_1$ (the Zener voltage), this voltage is equal to the voltage indicated by the reference letter Z in Fig. 3 and is sufficient to cause the diode to commence conduction in a reverse direction. Immediately thereafter the positive potential impressed on lead 37 causes the potential on the base 32 of transistor 31 to rise. When the base potential rises to a point where it is positive with respect to the potential on the emitter, which is connected to junction point 16, at zero reference potential, the transistor 31 commences conduction. Thereafter the potential on emitter 27 of transistor 22 drops so that the potential on the base of this transistor becomes positive with respect thereto and the transistor 22 also becomes conductive. The transistor 22 will not maintain steady conduction due to the resonant circuit connected to the base but instead will tend to operate in an oscillatory fashion. The inductance of the resonant circuit is coupled to the inductance 18; hence, during periods in which the transistor 22 conducts energy is fed back into the base circuit to sustain oscillation.

The value of positive potential imparted to junction point 12 is determined by the value of the resistance 13. A voltage regulator device 38 together with resistance 17 is connected in parallel across the resistance 13. Again the voltage regulator device 38 is in the form of a silicon Zener diode and functions to hold the potential at a junction point 40 to a value determined by the voltage necessary to cause current to flow through the transistor 22. If for some reason or another there is a surge of potential on the line 11 the potential applied to the reverse side of diode 38 increases thereby rendering this diode conductive to short circuit this surge and thereby preclude damage to any of the components in the receiving apparatus.

As the transistor 22 oscillates, the varying magnetic flux set up by primary winding 18 also induces potentials in an output winding 39 of the transformer 19. The oscillator will continue to oscillate until such time as a spacing condition is imparted on the signaling line 11 whereupon the decrease in signaling line current caused by a transition from a marking condition to a spacing condition causes the potential at junction point 12 to decrease with respect to the potential of point 16. The drop in potential on junction point 12 is impressed on the diode 34 and when the decreasing potential reaches a value $E_2$ (see wave form I, Fig. 2) the diode is precluded from further passing current. Inasmuch as current can no longer flow through the diode 34, the transistor 32 is rendered nonconductive and as a consequence the transistor 22 is precluded from further operation.

It may be understood that the oscillations induced in the windings 39 are representative of the marking impulse impressed on the line 11. The wave forms of these oscillations are illustrated in Fig. 2 by wave form II. Examination of the wave form shows that spacing signals are represented by an absence of any induced voltages in winding 39 and the marking impulses are represented by a series of oscillations which commence and terminate in oscillations of equal magnitude.

The pulses induced in winding 39 are applied over a lead 41 to a P-N-P type junction transistor amplifier 42. The output of the amplifier 42 is impressed through a coupling condenser 43 and through a pair of leads 44 and 46 leading, respectively, to a pair of diodes 47 and 48. The negative pulses are passed through the diode 47 and the A.C. components of the negative pulses are filtered to ground by means of an RC filter consisting of a resistance 49 and capacitance 51. In a like manner the positive pulses are passed through the rectifier diode 48 to an RC filter consisting of a resistance 52 and a capacitance 53. The action of the RC filter causes the A.C. components of the positive potential pulses to be passed to ground. The output of the RC circuit 49—51 is substantially a D.C. envelope of the positive A.C. pulses impressed on lead 44 whereas the output of the RC circuit 52—53 is a D.C. envelope of the A.C. negative pulses impressed on lead 46.

The negative D.C. potential is impressed on the base of a transistor 56. Transistor 56 has its emitter connected through a resistance 57 to ground and its collector is connected through a resistance 58 to a source of negative battery. The application of negative potential to the base of the transistor 56 drives the base negative with respect to its emitter and places this transistor in a conductive state. The collector of transistor 56 is connected to an output lead 59. Consequently, when the transistor assumes a conductive state the collector potential immediately rises to impress a positive going pulse over the lead 59 which pulse is not terminated until such time as the base of transistor 56 assumes a ground potential which is indicative of a spacing signal being impressed over the lead 11 (see wave form III, Fig. 2).

The output of the RC circuit 52—53 is impressed upon a base of a transistor 61 and functions to drive the base positive with respect to its emitter, hence placing this transistor in a nonconductive state. Transistor 61 is normally conducting because its base is connected through resistances 62 and 58 to the source of negative battery for the collector of transistor 56, and its emitter is connected to ground. When transistor 61 assumes a non-conductive state, due to the application of positive potential on its base, its collector potential immediately drops and a negative going pulse is impressed over a lead 63 which is the reverse of the direction of the pulse impressed over the lead 59 (see wave form IV, Fig. 2).

When the leading edge of the D.C. potential renders the transistor 56 conductive, the collector potential of the transistor immediately rises and this rise is impressed through resistance 62 to the base of the transistor 61 and thus combines with the leading edge of the positive going pulse coming from the the RC circuit 52—53 to instantly shut off the normally conducting transistor 61. Similarly when the trailing edge of the negative going D.C. pulse is applied to the base of transistor 56 to shut off this transistor, the collector potential immediately drops and this drop in potential is impressed through resistance 62 to help drive the base of transistor 61 negative with respect to its emitter to again place the transistor 61 in a conductive state.

The output D.C. pulse applied on lead 59 can be utilized to operate suitable recording apparatus to make a permanent record of the signals being transmitted from the distant station 10. The output over lead 59 can also be used to operate other electronic terminal receiving or regenerating equipment and, in which case, the output over lead 63 can be used to actuate other control components included in said electronic terminal or regenerating equipment. The output signals impressed on leads 59 and 63 have sharp transitions between marking and spacing signals thus insuring the instantaneous response of the equipment actuated by the signals.

It is to be understood that the above-described arrangements of circuits and components are simply illustrative of an application of the principles of the invention and many other modifications and changes may be made without departing from the invention.

What is claimed is:

1. In a signal reshaping device, a signaling line, means connected across said signaling line and responsive to an application of a signal for generating an oscillating output, a diode connected across said signal line and having a predetermined breakdown voltage for preventing the oscillating means from functioning until the voltage of said applied signal reaches said breakdown voltage, and means for limiting the voltage applied to the oscillating means to a value slightly above the breakdown voltage of the diode.

2. In a signal reshaping device, a signal generator, a signaling line connected to said generator, means connected across said signal line for developing voltages indicative of said signals, a transistor oscillator having a resonant base circuit, means including an inductance coupled with said resonant circuit for applying said developed voltages to said oscillator to supply operating potential thereto, a transistor means for holding said oscillator from operation, and a Zener diode interconnected in a reverse direction between said voltage developing means and said transistor means for holding said transistor means from operation until said developed voltage causes said diode to conduct whereupon said transistor means operates to render said oscillator operative.

3. In a signal reshaping device, means for generating signals having a predetermined potential level, a signaling line running to and from said signal generator, an oscillator connected across said line adapted to be operated by the application of signals to said line, a first diode means connected across said line and having a predetermined breakdown voltage below said predetermined signal potential level for preventing said oscillator from operating until said breakdown voltage is attained, and a second diode means connected across said line and having a predetermined breakdown voltage above said signal potential level for precluding surges of voltage from being applied to said oscillator.

4. A signal reshaping device comprising a first transistor having a base, emitter and collector, a second transistor having a base, emitter and collector, means interconnecting the emitter of the first transistor with the collector of the second transistor, a resonant circuit including an inductance connected to the base of the first transistor, a diode having a preselected breakdown voltage connected to said base of said second transistor, means responsive to signals for developing a voltage, means for applying said developed voltage to the collector of the first transistor and to the diode, whereupon said diode is rendered conducting to render conductive said first and second transistors, and means connected to the collector of the first transistor for feeding the output therefrom to the resonant circuit whereupon said first transistor produces an oscillatory output.

5. In a signal reshaping device, a signaling line, means for applying signals to said line, means connected to said line for developing voltages in response to each application of a signal, a transistor oscillator, a normally nonconducting transistor means connected to said transistor oscillator for precluding said oscillator from operation, a voltage limiting diode connected in a reverse direction between said voltage developing means and said transistor means for preventing current flow through said transistor means, said voltage limiting diode possessing the characteristic of permitting current flow in a reverse direction only when said developed voltage attains a predetermined magnitude whereupon said transistor is rendered conductive, means including an inductance for applying said developed voltage to operate said oscillator when said transistor means is rendered conductive, means including said inductance for feeding back the output of said oscillator means to sustain operation of said oscillator means, and means coupled with said inductance for generating output pulsations.

6. In a signal reshaping device, means for generating a potential in response to a signal, an oscillator connected in parallel with said potential generating means and adapted to be operated by said potential, a transistor having a base, emitter and collector, means connecting said collector to said oscillator, means connecting said emitter to the low potential side of said potential generating means, means for applying a predetermined potential to said base to hold said transistor in a nonconducting state whereby said oscillator is precluded from operation, means including a voltage regulating device connecting said base to the high potential side of said potential generating means, said voltage regulating device adapted to conduct current only when said generated potential reaches a predetermined value whereby said transistor is rendered conductive to permit operation of the oscillator.

7. In a device as defined in claim 6 wherein said oscillator has an inductive feed back circuit, and means inductively coupled to said inductive feed back circuit for producing output oscillations in response to the operation of the oscillator.

References Cited in the file of this patent

UNITED STATES PATENTS

| | | |
|---|---|---|
| 2,616,048 | Rubin | Oct. 28, 1952 |
| 2,622,212 | Anderson et al. | Dec. 16, 1952 |
| 2,641,717 | Toth | June 9, 1953 |
| 2,655,608 | Valdes | Oct. 13, 1953 |
| 2,703,368 | Wrathall | Mar. 1, 1955 |
| 2,705,287 | Lo | Mar. 29, 1955 |
| 2,714,702 | Shockley | Aug. 2, 1955 |
| 2,795,696 | Evans | June 11, 1957 |